(12) United States Patent
Kyo et al.

(10) Patent No.: US 10,930,006 B2
(45) Date of Patent: Feb. 23, 2021

(54) OTHER VEHICLE POSITION ESTIMATION APPARATUS

(71) Applicant: DENSO CORPORATION, Kariya (JP)

(72) Inventors: Takuma Kyo, Kariya (JP); Masaaki Sasahara, Kariya (JP); Junichiro Funabashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 16/357,716

(22) Filed: Mar. 19, 2019

(65) Prior Publication Data

US 2019/0295283 A1    Sep. 26, 2019

(30) Foreign Application Priority Data

Mar. 23, 2018   (JP) ................................ JP2018-56137

(51) Int. Cl.
*G06T 7/70*   (2017.01)
*G06K 9/00*   (2006.01)
*G01C 21/32*   (2006.01)

(52) U.S. Cl.
CPC ............. *G06T 7/70* (2017.01); *G01C 21/32* (2013.01); *G06K 9/00825* (2013.01); *G06T 2207/30252* (2013.01)

(58) Field of Classification Search
CPC .................................................. G06K 9/00825
See application file for complete search history.

(56) References Cited

U.S. PATENT DOCUMENTS

| 2007/0282532 A1 | 12/2007 | Yamamoto et al. |
| 2017/0220880 A1* | 8/2017 | Jen ............................ B60Q 9/00 |
| 2019/0126922 A1* | 5/2019 | Natroshvili ............... G06T 7/20 |

FOREIGN PATENT DOCUMENTS

JP         5082349 B2    11/2012

* cited by examiner

*Primary Examiner* — Ping Y Hsieh
*Assistant Examiner* — Jose M Torres
(74) *Attorney, Agent, or Firm* — Maschoff Brennan

(57) ABSTRACT

An other vehicle position estimation apparatus for estimating the position of another vehicle on the road using a particle filtering process includes an other vehicle map matcher and a particle number controller. The other vehicle map matcher includes an updater for updating the position of a particle distributed on a map, a likelihood calculator for calculating the likelihood of the particle position, and a position estimator configured to estimate the position of the other vehicle based on the position of the particle. The particle number controller determines a number of particles to distribute based on at least one of (i) a relative positional relationship between a subject vehicle and the other vehicle, (ii) an actual vehicle speed of the other vehicle, (iii) a distribution state of the particles, and (iv) a relationship between the position of the other vehicle and the road.

11 Claims, 8 Drawing Sheets

PARTICLE NUMBER CONTROLLER 112

MAXIMUM PARTICLE NUMBER ASSIGNMENT ATTEMPT PROCESS

FIG. 9
| OTHER VEHICLE POS | $W_{TC}$ | FIG. 10 REPRESENTATION |
|---|---|---|
| ON ROUTE OF SUBJECT VEHICLE | 1.0 | 2b1 |
| NEAR SUBJECT VEHICLE AT INTSEC | 1.0 | 2b2 |
| OTHER | 0.5 | 2b3 |
FIG. 10
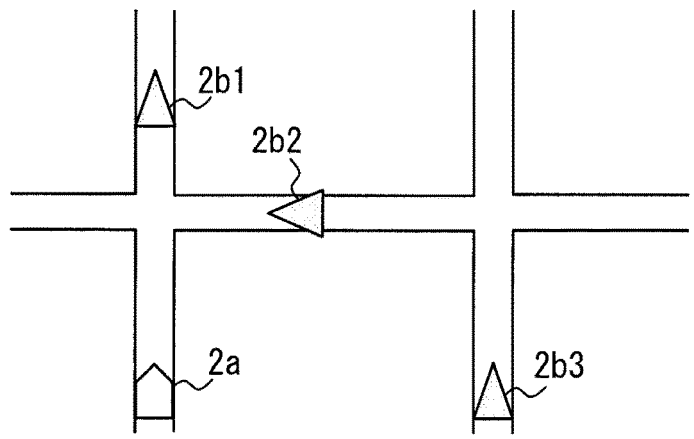
FIG. 11
| OTHER VEHICLE POS | $W_{STATE}$ |
|---|---|
| ON ROAD | 1.0 |
| OUTSIDE OF ROAD | 0.5 |
| UNDETERMINABLE | 0.2 |
FIG. 12
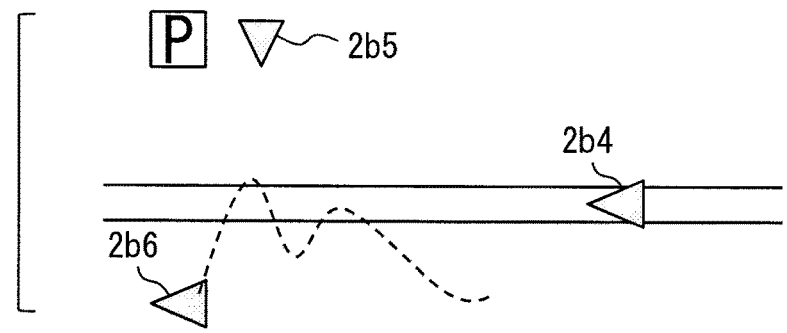

FIG. 13

| DISTRIBUTION DIAMETER | $G_{VAR}$ |
|---|---|
| 10m~ | 5 |
| 2~10m | 4 |
| ~2m | 2 |

FIG. 14

| DISTANCE FROM SUBJECT VEHICLE | $G_{DIST}$ |
|---|---|
| ~50m | 5 |
| 50~100m | 4 |
| 100m~ | 2 |

FIG. 15

| NUMBER OF ROAD IDS | $G_{NUMEDGE}$ |
|---|---|
| 3~ | 3 |
| 2 | 2 |
| 1 | 1 |

FIG. 16

| ROAD TYPE | $G_{ATTR}$ |
|---|---|
| EXPY | 2 |
| OTHER | 1 |

OTHER VEHICLE POSITION ESTIMATION APPARATUS

CROSS REFERENCE TO RELATED APPLICATION

The present application is based on and claims the benefit of priority of Japanese Patent Application No. 2018-056137, filed on Mar. 23, 2018, the disclosure of which is incorporated herein by reference.

TECHNICAL FIELD

The present disclosure relates to a vehicle position estimation apparatus for estimating the position of another vehicle relative to a subject vehicle, and more particularly, to an apparatus for estimating a position of the other vehicle on a road.

BACKGROUND INFORMATION

Other vehicles traveling around a subject vehicle may be mapped to road map data in the subject vehicle based on coordinates transmitted from the other vehicle. These coordinates may only indicate that the other vehicle is on or at a position near the road, but not necessarily specify the other vehicle's position on the road.

Mapping the position of another vehicle relative to the subject vehicle can increase the data processing load and processing time in the subject vehicle. As such, position mapping of another vehicle's position relative to a subject vehicle is subject to improvement.

SUMMARY

The present disclosure describes an other vehicle position estimation apparatus that is capable of estimating a position of another vehicle on the road while limiting and/or preventing increases in the processing time for such an estimation.

BRIEF DESCRIPTION OF THE DRAWINGS

Objects, features, and advantages of the present disclosure will become more apparent from the following detailed description made with reference to the accompanying drawings, in which:

FIG. 9 illustrates a table for determining a correction coefficient;

FIG. 10 illustrates a position of the other vehicle based on the table of FIG. 9;

FIG. 11 illustrates a table for determining another correction coefficient;

FIG. 12 illustrates a position of the other vehicle based on the table of FIG. 11;

FIG. 13 illustrates a table for determining an accuracy evaluation score;

FIG. 14 illustrates a table for determining another accuracy evaluation score;

FIG. 15 illustrates a table for determining another accuracy evaluation score;

FIG. 16 illustrates a table for determining another accuracy evaluation score.

DETAILED DESCRIPTION

Figure 1:
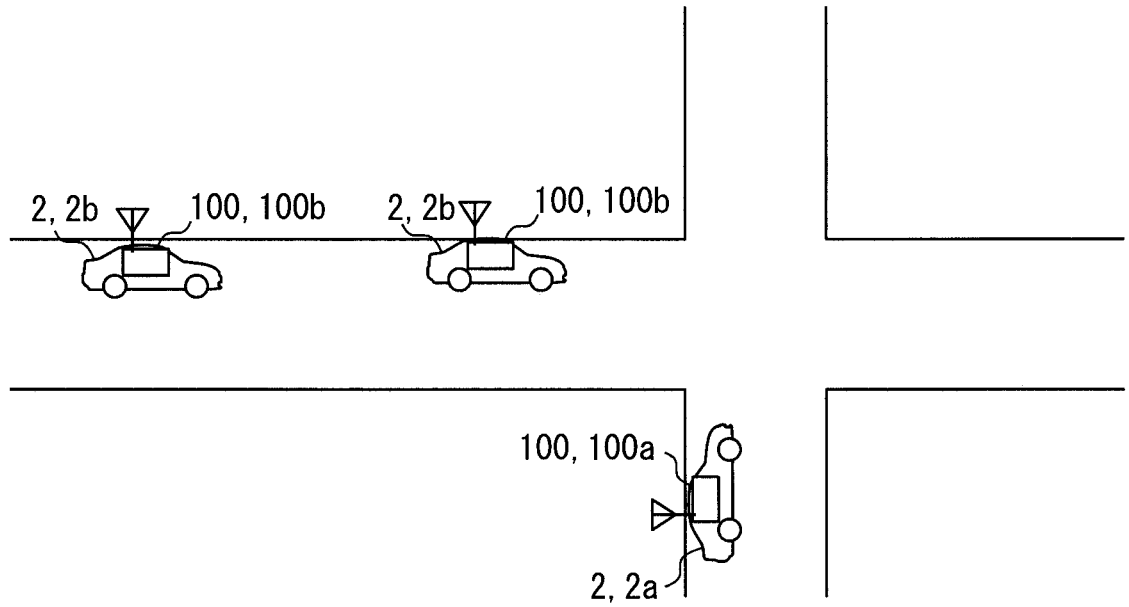
FIG. 1 illustrates an example use environment of an other vehicle position estimation apparatus.

Related map matching technology may map a position of another vehicle on the road relative to a subject vehicle by representing the position of the other vehicle as map data based on coordinates transmitted from the other vehicle. The coordinates transmitted from the other vehicle do not necessarily specify the other vehicle's position on the road, but rather provide some indication that the other vehicle should be on the road, regardless of whether the other vehicle is actually on the road. Consequently, in the subject vehicle, the position of the other vehicle is mapped to the road represented by the map data in the subject vehicle. By mapping the position of the other vehicle to a road represented by the map data in the subject vehicle, the accuracy of the drive support operations in the subject vehicle can be improved based on the position of the other vehicle and the position of the subject vehicle.

In the map matching of the related technology, a travel locus of the other vehicle is obtained in the subject vehicle based on information transmitted from the other vehicle. Then, the travel locus is compared with a road shape represented by the map data in the subject vehicle, and the position of the other vehicle is mapped to the road represented by the map data in the subject vehicle.

Since the related technology relies on the subject vehicle calculating a travel locus for the other vehicle, there may be a large amount of processing time in the subject vehicle to both calculate and update the travel locus of the other vehicle. In instances where the position of the other vehicle is used to determine whether to provide a drive support operation in the subject vehicle, it is desirable to quickly estimate the position of the other vehicle on the road while limiting the processing load and processing time in estimating the position of the other vehicle.

The present disclosure describes an other vehicle position estimation apparatus that is capable of estimating a position of another vehicle on the road while limiting and/or preventing increases in the processing time for such estimation.

The other vehicle position estimation apparatus calculates the number of particles to be distributed for estimating the position of each of the plurality of the other vehicles based on at least one of the relative relationship between the position of the subject vehicle and the position of the other vehicle, the actual vehicle speed of the other vehicle, the distribution state of the particles, and the relationship between the position of the other vehicle and the road.

Each of the relative relationship between the position of the subject vehicle and the position of the other vehicle, the actual vehicle speed of the other vehicle, the distribution state of the particles, and the relationship between the position of the other vehicle and the road may be used as an index for determining the position estimation accuracy of the other vehicle. Consequently, the number of particles determined based on at least one of the relative relationship between the position of the subject vehicle and the position of the other vehicle, the actual vehicle speed of the other vehicle, the distribution state of the particles, and the relationship between the position of the other vehicle and the road may make it possible to limit and/or prevent deteriorations in the position estimation accuracy with respect to the other vehicle(s), where such a high degree of position estimation accuracy is desired.

Since it is possible to dynamically (e.g., as required, on demand) change the number of particles to be distributed to estimate the position of each of the other vehicles, increases to the processing time for such an estimation can be limited and/or prevented, even in instances where the number of the other vehicles being position estimated increases, and/or where the estimation accuracy for the other vehicle(s) is increased.

The embodiment is described with reference to the drawings. FIG. 1 illustrates an example environment where an other vehicle position estimation apparatus 100 is used. The other vehicle position estimation apparatus 100 may be mounted on/in a vehicle 2, or be disposed in the vehicle 2 for use in the vehicle 2. The vehicle 2 may be a vehicle that travels on a road, such as, for example, an automobile, a truck, a motorcycle, and a bicycle.

The other vehicle position estimation apparatuses 100a and 100b are used respectively in a subject vehicle 2a and other vehicles 2b, respectively. The description may distinguish the vehicles 2 from one another by using the subject vehicle 2a to refer to a vehicle itself (e.g., as a point of reference), and the other vehicle 2b to refer to one or more vehicles other than the subject vehicle 2a. For example, the other vehicle position apparatus 100a used in the subject vehicle 2a may estimate the positions of the other vehicles 2b relative to the subject vehicle 2a. When describing the vehicles 2 generally, for example, where a distinction between the subject vehicle 2a and the other vehicles 2b is not necessary, the subject vehicle 2a and the other vehicles 2b may be referred to collectively as the vehicle 2 or the vehicles 2.

The other vehicle position estimation apparatuses 100a and 100b have the same configuration. When it is not necessary in the description to distinguish the other vehicle position estimation apparatuses 100a and 100b from one another, the other vehicle position estimation apparatuses 100a and 100b may be described collectively as the other vehicle position estimation apparatus 100. The example use environment shown in FIG. 1 shows three other vehicle position estimation apparatuses 100, but the number of apparatuses 100 in use may be greater than three, or less than three. That is, the number of vehicles 2 using the other vehicle position estimation apparatus 100 may be greater than three or less than three.

[Configuration of the Other Vehicle Position Estimation Apparatus]

Figure 2:
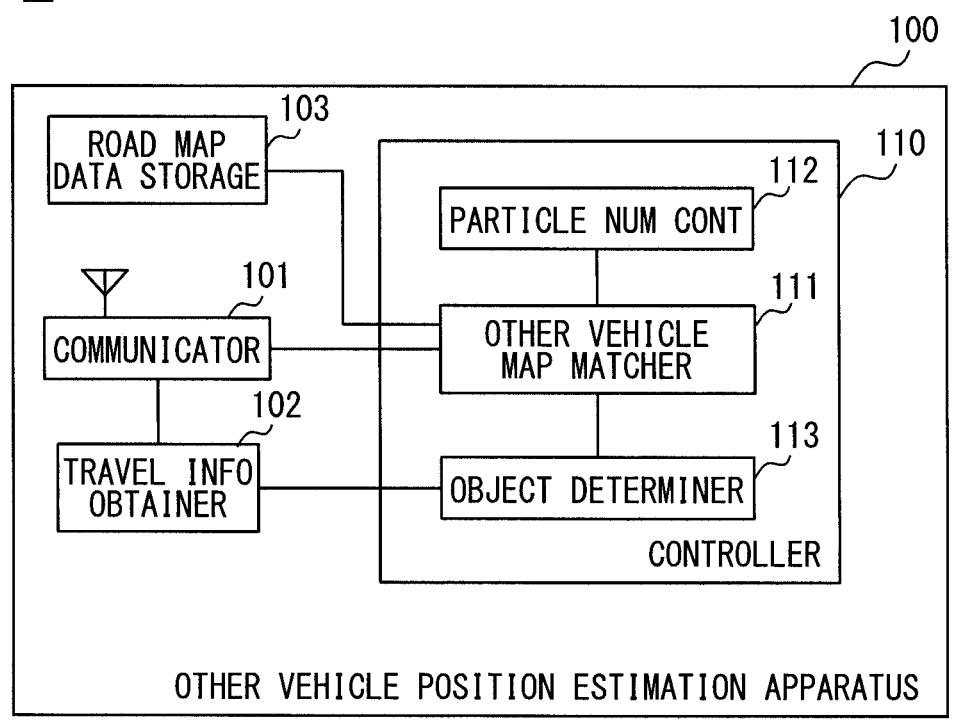
FIG. 2 illustrates a schematic configuration of the other vehicle position estimation apparatus.

FIG. 2 shows the configuration of the other vehicle position estimation apparatus 100. The other vehicle position estimation apparatus 100 includes a communicator 101, a travel information obtainer 102, road map data storage 103, and a controller 110.

The communicator 101 is configured to transmit and receive vehicle-to-vehicle (V2V) communication packets to and from the communicator 101 in the other vehicle position estimation apparatuses 100 installed in other vehicles 2. For example, the communicator 101 in the other vehicle position estimation apparatus 100a in the subject vehicle 2a is configured to transmit/receive V2V communication packets from the communicator 101 in the other vehicle position estimation apparatuses 100b in the other vehicles 2b. The communicator 101 can transmit and receive a V2V communication packet via short-range wireless communication. Various communication standards such as IEEE 802.11 (e.g., 802.11p (WAVE)) and ARIB STD-T109 may be used to implement the short-range wireless communication between the vehicles 2. The communicator 101 may also transmit and receive V2V communication packets by a wide area wireless communication standard such as, for example, Long-Term Evolution (LTE).

The travel information obtainer 102 may sequentially obtain travel information, that is, position by position, in order, as the vehicle 2 travels. In other words, the travel information obtainer may obtain, either continuously or periodically, vehicle position, speed, direction, and like data for the subject vehicle 2a as the subject vehicle 2a is traveling. For example, the travel information obtainer 102 may obtain either continuous sequential or discrete sequential (e.g., fixed interval samples) travel information related to vehicle position, speed, and direction. The travel information obtainer 102 can provide the travel information to the communicator 101. The communicator 101 can sequentially broadcast the travel information to vehicular networks (e.g., VANETs), road side units (RSUs), and other vehicular infrastructure, and to other surrounding vehicles 2b. A sequential broadcast may mean either a continuous or periodic update of the vehicle travel information (e.g., last n number of sequential data samples, where n is a natural number or a positive integer.)

The travel information includes a position and a speed of the vehicle 2. The travel information obtainer 102 of the present embodiment obtains information required for generating a basic safety message (BSM) including the position and the speed of the vehicle 2. The travel information obtainer 102 sequentially provides the generated BSM to the communicator 101 as the travel information described above.

The BSM includes an ID of the vehicle 2 (e.g., an identification number) in addition to the position, travel speed, direction of travel, and a braking state of the vehicle 2. Other information such as vehicle size and acceleration may also be included in the BSM.

The travel information obtainer 102 may be directly or indirectly connected to vehicle sensors and actuators by an in-vehicle local area network (LAN) to detect the various information included in the BSM. The BSM includes not only the position of the vehicle 2, but also the travel direction, the travel speed, the acceleration, and the yaw rate of the vehicle 2, and all of these attributes may be referred to, either individually or collectively, as a "travel state."

The position of the vehicle 2 is represented by coordinates including latitude and longitude, and may also include altitude. The position of the vehicle 2 may be calculated by a GNSS receiver (e.g., GPS) in or on the vehicle 2. The speed of the vehicle 2 may be calculated based on a signal detected by a vehicle speed sensor or a wheel speed sensor. The traveling direction of the vehicle 2 may be calculated by a change in the position of the vehicle 2 (e.g., a detection value of an inertia sensor such as a yaw rate sensor, accelerometer, gyroscope, or like device.

The road map data storage 103 is a storage device (e.g., database, memory) that stores road map data. The road map data may include data in human readable format such as, for example, graphical representations of a road shape, a travel direction of the road, a road type (e.g., one-way traffic, divided highway), an amount of lanes, surrounding buildings, structures, points of interest, and text. The road map data may be displayed on a vehicles infotainment display, navigation display, or other display. The road map data may also include a more machine friendly format for processing such as the representation of roads as "link" objects and the representation of intersections as "node" objects. That is, as a link object, the shape of the road may be represented by a line. The node object, that is, an intersection with coordinates representing a position at which two or more links (i.e., roads) intersect may be represented as a dot or a point (i.e., a node). The map object data may be displayed on the above-described vehicle display as a series of lines and points, or may be used as the basis for displaying a more human readable format on the vehicle display such as a map showing the actual shape, direction, and dimensions of the road. In the road map data, each of the roads has an assigned road ID such that each road can be identified by the road ID.

The controller 110 is a computer that includes one or more CPUs (processor cores); memory such as ROM, RAM, and flash memory; and input/output (I/O) circuitry, peripherals, and ports (all not shown). These computer components may be connected to each other via a bus line (also not shown). The ROM may store a program or instruction set that when executed by the CPU causes the controller 110 to perform the functions and processes associated with the controller 110. For example, upon execution of a program, the controller 110 may function as an other vehicle map matcher 111, a particle number controller 112, and an object determiner 113. When the controller 110 performs these functions, a method corresponding to the program is performed. The storage medium for storing the program executed by the CPU is not limited to the ROM. That is, the program may be stored in any type of a non-transitory, substantive recording medium/computer-readable medium. For example, the program may be stored in a flash memory. The RAM may be used for temporary storage when the program is executed, for example, to store arithmetic and computational data that may be used by the program. Though the other vehicle map matcher 111, the particle number controller 112, and the object determiner 113 functions of the controller 110 may be described as functions performed by the controller upon execution of a program stored in memory by a CPU, these functions may also be realized by hardware components. For example, each of the other vehicle map matcher 111, the particle number controller 112, and the object determiner 113 elements may be realized by analog circuit components, digital circuit components, logical circuit components, and/or a combination of circuit components, and configured to perform the functions/processes associated with each of these elements (i.e., elements 111, 112, and 113). In addition, the other vehicle map matcher 111, the particle number controller 112, and the object determiner 113 elements may be configured as specialized circuits, for example, as application-specific integrated circuits (ASICs) or field-programmable gate arrays (FPGAs), configured to perform the functions/processes associated with each of these elements. The controller 110 may realize the other vehicle map matcher 111, the particle number controller 112, and the object determiner 113 as functions by software executed by the CPU, as hardware elements, or as a combination of hardware and software.

The functions/processes performed by the other vehicle map matcher 111, the particle number controller 112, and the object determiner 113 of the controller 110 are described in greater detail below using examples from the standpoint of the other vehicle position estimation apparatus 100a of the subject vehicle 2a. That is, the description of the functions performed by the other vehicle map matcher 111, the particle number controller 112, and the object determiner 113 assumes that these elements are performing the respective processes in the other vehicle position estimation apparatus 100a in the subject vehicle 2a.

The other vehicle map matcher 111 estimates a position of the other vehicle 2b on a road of the road map data by using a particle filter. Estimating a position of the other vehicle 2b on a road of the map data is considered as "map matching," that is, matching the estimated position of the other vehicle 2b to the road map data. Here, "particle filter" refers to the particle filter as used in computational statistics. Particle filtering or particle filters may also be referred to as Sequential Monte Carlo (SMC) methods and use Monte Carlo algorithms for statistical computing. Particle filtering uses a set of particles that may also be referred to as "samples" to represent a distribution (e.g., of a stochastic process, of random variables).

The particle filter/filtering distributes (i.e., sprinkles) particles that serve as candidates for a position of the other vehicle 2b on the road, then obtains a position likelihood L of each of those particles, resamples the particles based on the likelihood L, and updates the position of the particles, repeatedly.

Then, the position of the other vehicle 2b is estimated from the degree of convergence of the particles (e.g., how distributed particles converge to a certain position on the road). The process performed by the other vehicle map matcher 111 is described below in greater detail with reference to FIG. 4.

The particle number controller 112 determines the number of particles distributed by the other vehicle map matcher 111, and notifies the other vehicle map matcher 111 of the determined number of particles. In order to determine the number of particles, the particle number controller 112 uses at least one of a relative relationship between the position of the subject vehicle 2a and the position of the other vehicle 2b, a distribution state of the particles, and a relationship between the position of the other vehicle 2b and the road.

The object determiner 113 determines a relative relationship between the subject vehicle 2a and the other vehicle 2b on the road based on both the position of the other vehicle 2b as estimated by the other vehicle map matcher 111, and the position of the subject vehicle 2a obtained by the travel information obtainer 102. Example relative relationships determined by the object determiner 113 may be: when the other vehicle 2b is traveling on the same road as the subject vehicle 2a and is in front of the subject vehicle 2a; when the other vehicle 2b is approaching the subject vehicle 2a at an intersection; or when the other vehicle 2b is traveling on a road different than the road on which the subject vehicle 2a is currently traveling, where the different road never intersects the road on which the subject vehicle 2a is currently traveling. The object determiner 113 outputs the determined relative relationship to a predetermined processing unit that performs a drive support operation. The drive support operation may be, for example, automatic braking, automatic steering, and a warning to the driver.

[Flow of Processes Among Different Parts]

Figure 3:
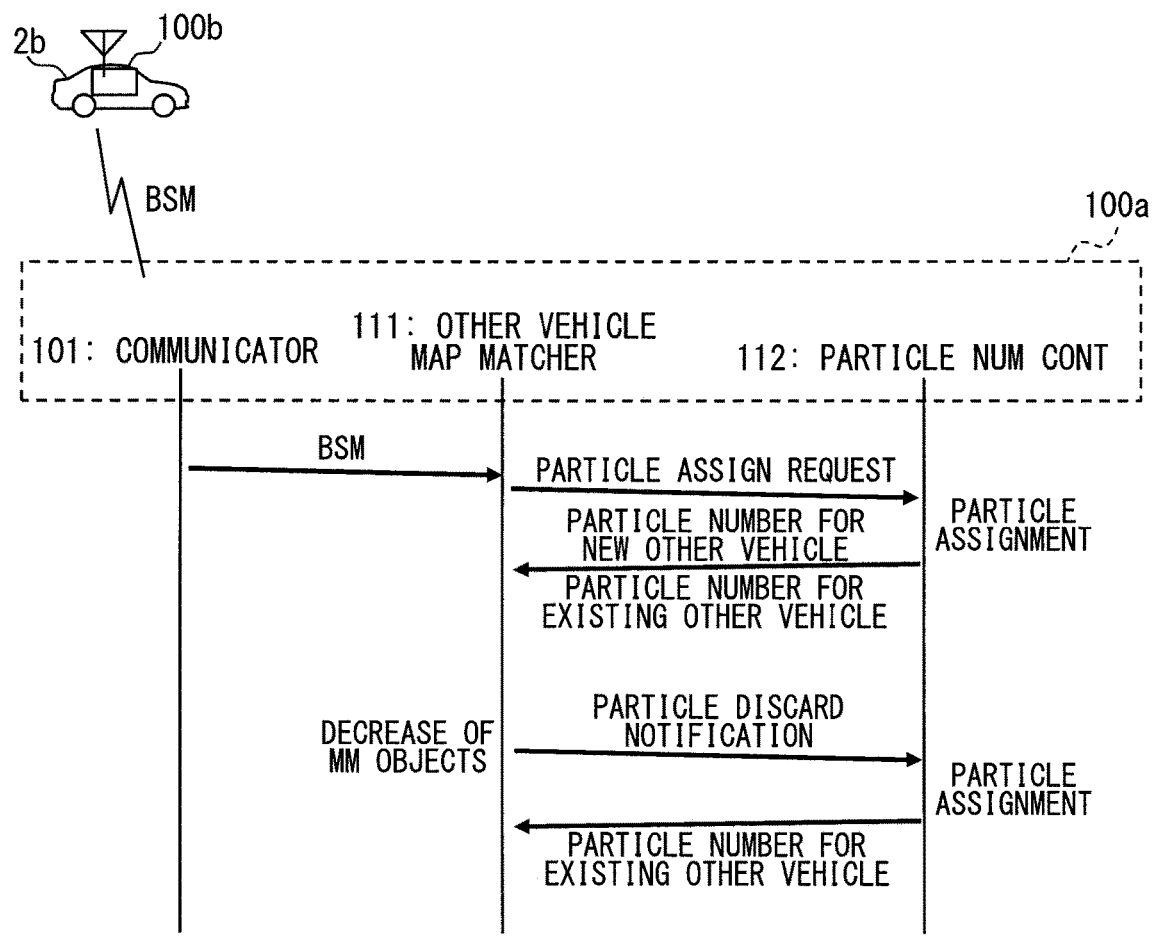
FIG. 3 illustrates a process flow between parts of the other vehicle position estimation apparatus.

FIG. 3 shows a flow of processes among the communicator 101, the other vehicle map matcher 111, and the particle number controller 112. The flow process in FIG. 3 assumes the components (e.g., communicator 101, the other vehicle map matcher 111, and the particle number controller 112) are in the other vehicle position estimation apparatus 100a of the subject vehicle 2a, unless otherwise indicated. When receiving the BSM transmitted by the other vehicle 2b, the communicator 101 transfers the BSM to the other vehicle map matcher 111. When the other vehicle map matcher 111 receives the BSM from the other vehicle 2b, the other vehicle map matcher 111 outputs a particle assignment request to the particle number controller 112 when the other vehicle 2b has not yet been map matched. The other vehicle 2b that has not yet been map matched may be referred to as a "new other vehicle" 2b. That is, the determination and designation of a new other vehicle 2b is determined based on whether the other vehicle map matcher 111 has already estimated a position of the other vehicle 2b.

Upon obtaining the particle assignment request, the particle number controller 112 determines the number of particles to be assigned to each of the other vehicles 2b that are periodically sending BSMs to the communicator 101 of the subject vehicle 2a. The particle number controller 112 then notifies the other vehicle map matcher 111 of the numbers of particles assigned to the new other vehicle(s) 2b and to the existing other vehicle(s) 2b. An existing other vehicle 2b is another vehicle 2b to which the particle number controller 112 has already assigned particles in the past.

The other vehicle map matcher 111 performs particle filtering based on the number of particles in the notification from the particle number controller 112, and then estimates the position of each of the other vehicles 2b on the road. The other vehicle map matcher 111 excludes other vehicles 2b from the map matching when a BSM is from the other vehicles 2b has been received after an estimation ending period $T_e$ has elapsed. In such manner, the number of the other vehicles 2b that need to be position-estimated on the road by map matching can be reduced. Exclusion from the map matching means that the particle used for the excluded other vehicle 2b is discarded.

When the number of the other vehicles 2b to be map matched is reduced, the other vehicle map matcher 111 notifies the particle number controller 112 of the discarded particles used for estimating the position of the excluded other vehicles 2b. When obtaining such a notification, the particle number controller 112 determines the number of particles to be assigned to each of the remaining other vehicles 2b (i.e., not including the excluded other vehicles 2b). The particle number controller 112 then notifies the other vehicle map matcher 111 of the number of particles assigned to each of the other vehicles 2b.

The other vehicle map matcher 111 estimates the position of the other vehicle(s) 2b on the road by particle filtering using the new number of particles provided in the notification from the particle number controller 112.

[Process of the Other Vehicle Map Matcher]

A process performed by the other vehicle map matcher 111 is described with reference to FIG. 4. As described above, when the communicator 101 receives a BSM, the other vehicle map matcher 111 obtains the BSM from the communicator 101.

Figure 4:
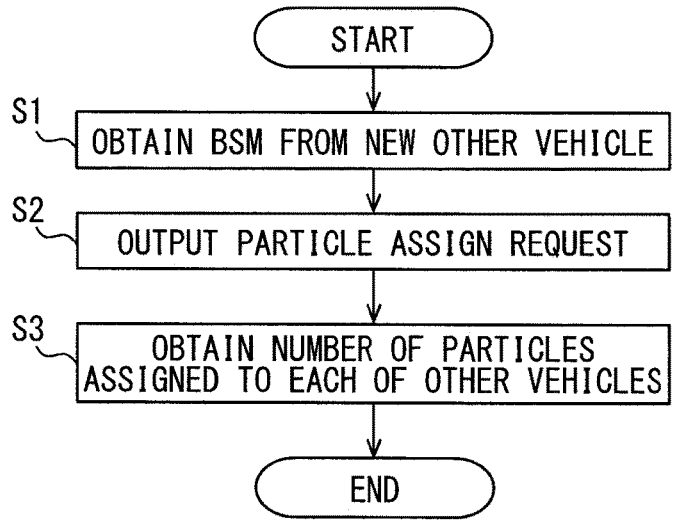
FIG. 4 is a flowchart of a process performed by an other vehicle map matcher in the other vehicle position estimation apparatus.

The process shown in FIG. 4 shows a process performed by the other vehicle map matcher 111 when the other vehicle map matcher 111 (i.e., of the subject vehicle 2a) receives a BSM from a new other vehicle 2b. At S1, the other vehicle map matcher 111 obtains the BSM transmitted by the new other vehicle 2b from the communicator 101 (i.e., in the other vehicle position apparatus 100a). More specifically, this process at S1 means that the other vehicle map matcher 111 has obtained a BSM from the communicator 101, and that the BSM is a BSM transmitted by a new other vehicle 2b.

The position of the other vehicle 2b is included in the BSM. The other vehicle's position may be detected (i.e., determined) by a device in the other vehicle 2b (e.g., a GNSS receiver). The description assumes that the position of the other vehicle 2b included in the BSM is set as "an observed position Z." Since the BSM is obtained from each of the other vehicles 2b, the observed position Z is also obtained from each of the other vehicles 2b.

At S2, the other vehicle map matcher 111 outputs the particle assignment request to the particle number controller 112. The particle assignment request includes the BSM of the new other vehicle 2b. Upon obtaining the particle assignment request, the particle number controller 112 determines the number of particles to be assigned to each of the other vehicles 2b, and notifies the other vehicle map matcher 111 of the number of particles determined by the particle number controller 112. At S3, the other vehicle map matcher 111 obtains (i.e., receives) the notification from the particle number controller 112 with the number of particles assigned to each of the other vehicles.

Figure 5:
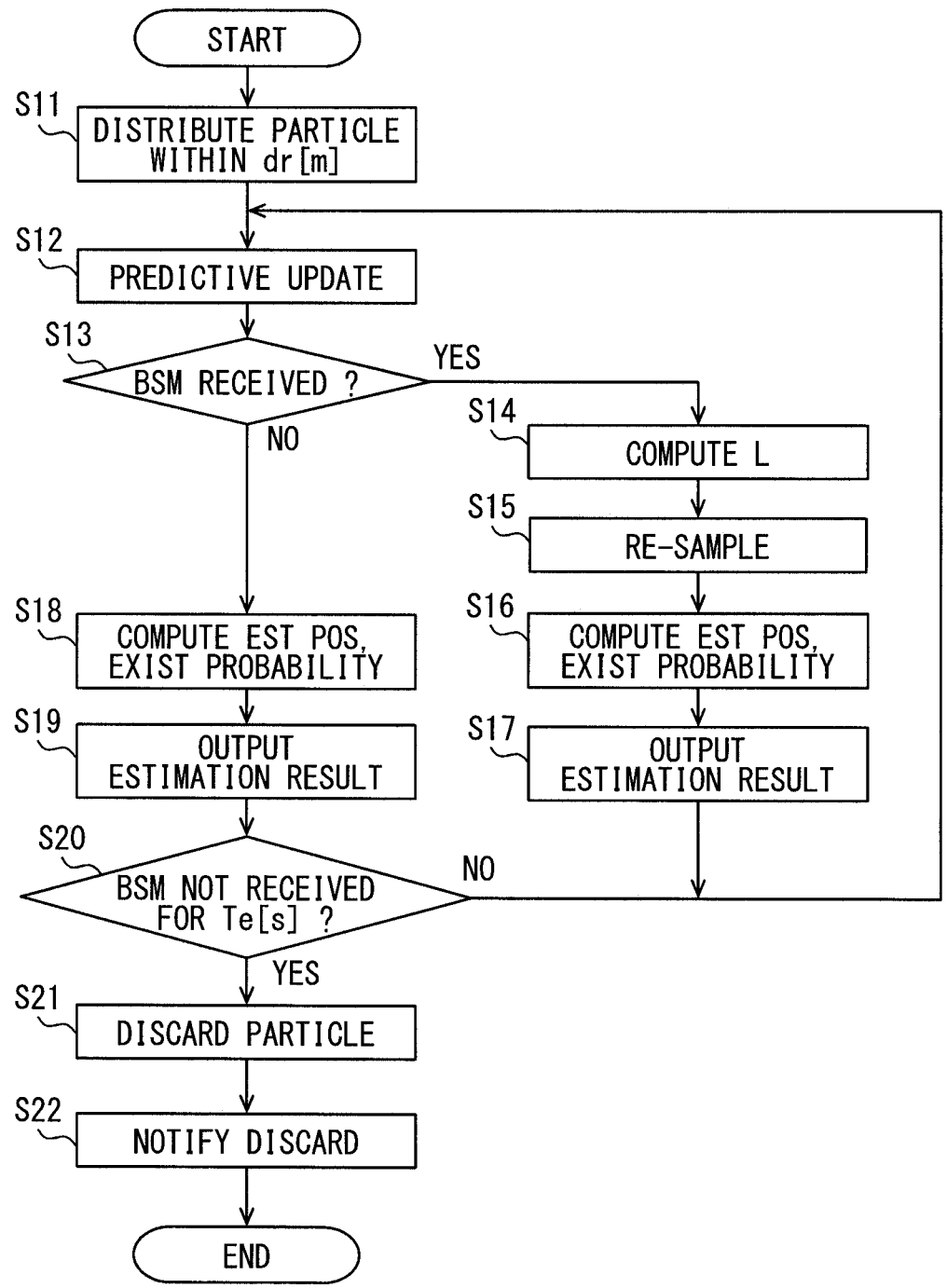
FIG. 5 is a flowchart of a process performed by the other vehicle map matcher when a particle number is updated.

FIG. 5 shows a process performed by the other vehicle map matcher 111 of the controller 110 when the number of particles is updated. When the other vehicle map matcher 111 performs the process shown in FIG. 4 and the other vehicle map matcher 111 is updated with (i.e., is notified of) the number of particles for the new other vehicle(s) 2b, the other vehicle map matcher 111 also performs the process in FIG. 5, because the notification in FIG. 4 means that the number of particles is updated.

At S11, the other vehicle map matcher 111 distributes the number of particles received at S3 on a road within a radius $d_r$ (m) centered on the observed position Z of the other vehicle 2b as indicated in the BSM from the other vehicle 2b. The size of the radius $d_r$ may be set in advance. For example, the radius $d_r$ may be defined as a length obtained by adding a constant value to an average error of the position of the vehicle 2 included in the BSM. The above definition of the radius $d_r$ intends to include a portion of the road within the radius $d_r$.

The position of each of the particles distributed within the radius $d_r$ from the observed position Z can be randomly determined. Alternatively, the particles may be distributed by being weighted by the distance of each particle from the observed position Z. When there are a plurality of roads within the radius $d_r$, ratios of particles may be distributed on the respective roads based on a degree of matching between the travel direction of the new other vehicle 2b and the travel directions of the respective roads. That is, for example, the ratios of distributed particles on roads going in the same travel direction as the new other vehicle 2b may be different than the ratios of particles on roads going in the opposite travel direction of the new other vehicle 2b.

In FIG. 5, the processes at S12 through S22 are performed not only when the other vehicle map matcher 111 makes a new other vehicle 2b determination, but also performs the processes at S12 through S22 for existing other vehicle(s) 2b. At S12, the other vehicle map matcher 111 performs a predictive update for each of the distributed particles. The predictive update is a process of updating the position of a particle. Since the particles are distributed on the road, the travel direction of the road and particles are thus fixed. If a moving speed of the particle can be determined, the position of the particle can be updated. The moving speed of a particle may be based on the speed limit of the road. At S12, the other vehicle map matcher 111 of the controller 110 performs an update process, and as such, may be referred to as an "updater" when performing the process at S12.

As for the moving speed of the particle, a speed included in the latest BSM obtained from the other vehicle 2b may be used. That is, the speed in the BSM of the other vehicle 2b that corresponds to the relevant particle may be used as the moving speed of the particle. A travel distance may be calculated by multiplying the speed included in the latest BSM by an amount of time that has elapsed since last performing the process at S12. That is, the amount of time between when the other vehicle map matcher 111 (i.e., the updater) last performs the predictive update process and then the other vehicle map matcher 111 currently performs the predictive update process at S12. The position of a particle after the predictive update is updated to a position derived by adding arbitrarily set system noise together with the above-described travel distance to a pre-update position along the travel direction of the road. When the particles pass through an intersection or a branch point on the map, the following process can be performed. For example, by using the position, the travel direction, and the yaw rate included in the BSM, it is possible to advance a particle (i.e., a position of the particle) to a road that best matches with a travel course as determined by a combination of the position, the travel direction, and the yaw rate. Without limiting an estimated position to the road that best matches the travel course, it is also possible to assign the particles according to the degree of matching between the road after the intersection or the branch point and the travel course. It may also be possible to randomly assign a plurality of particles to the road after the intersection or the branch point.

At S13, the other vehicle map matcher 111 determines whether a new BSM has been received. If the other vehicle map matcher 111 determines that a new BSM has been received, i.e., "YES" at S13, the process proceeds to S14. At S14, the other vehicle map matcher 111 calculates the likelihood L of the position of each of the particles after the predictive update at S12. That is, at S14, the other vehicle map matcher 111 calculates a degree of likelihood of the position of the distributed particle based on a motion state of the distributed particle and the travel state of the other vehicle. Various calculation methods may be used to calculate the likelihood L. An example calculation of the likelihood L is shown below in equation 1.

$$L = \frac{1}{(2\pi)^2 \sqrt{|\Sigma_t|}} \exp\left(-\frac{1}{2}(Z_t - Y_t)^T \sum_t^{-1} (Z_t - Y_t)\right) \quad \text{(Equation 1)}$$

In equation 1, t is time, T is a transposed matrix, Y is a position of a particle after the predictive update, Z is an observed position, and $\Sigma$ is a covariance matrix. The covariance matrix can be defined by inputting the observation capacity lower limit value of each item of Z. The observation capacity lower limit value can be obtained from the other vehicle 2b via the BSM, or can also be set to a value that conforms to laws and regulations. At S14, the other vehicle map matcher 111 of the controller 110 performs a likelihood calculation process, and as such, may be referred to as a "likelihood calculator" when performing the process at S14. The process then proceeds to S15.

At S15, the other vehicle map matcher 111 resamples each of the particles. Resampling means rearranging the position of each of the particles according to the value of the likelihood L calculated at S14. By resampling, the position of a particle with a relatively small likelihood L is moved to the position of a particle with a relatively large likelihood L, thus making the number of particles at each position proportional to the likelihood L. The process then proceeds to S16.

At S16, the other vehicle map matcher 111 calculates an estimated position of the other vehicle 2b and an existence probability based on the position of each of the particles after the resampling at S15. The existence probability is the probability of other vehicles 2b existing, and on which of a plurality of roads. For example, supposing that 70% of particles exist on a certain road R1 and 30% of particles exist on another road R2. In such a case, the existence probability of the other vehicles 2b existing on the road R1 is 70%, and the existence probability of the other vehicles 2b existing on the road R2 is 30%. The estimated position is a position obtained by averaging the positions of the particles existing on each of the roads. The estimated position of the other vehicle 2b can be represented as a distance from a reference starting point on the road. The reference starting point is a point on the road where the travel of the other vehicle 2b begins and travels in the travel direction of the road. Where roads are represented as "links" or straight lines in the road map data, the starting reference point may be an end point of the road, for example, where the road begins after an intersection. At S16, the other vehicle map matcher 111 of the controller 110 performs a position estimation process, and as such, may be referred to as a "position estimator" when performing the process at S16. The process then proceeds to S17.

At S17, the other vehicle map matcher 111 outputs the estimated position and the existence probability obtained at S16 to a predetermined processing unit that performs a drive support operation, and the process then returns to S12.

If the other vehicle map matcher 111 determines that a BSM has not been received, i.e., "NO" at S13, the process proceeds to S18. The process at S18 is similar to the process at S16. That is, at S18, the other vehicle map matcher 111 calculates the estimated position and the existence probability of the other vehicle 2b based on the position of the particles. However, when the other vehicle map matcher 111 performs the process at S18, only the predictive update at S12 has been performed without performing the resampling based on the particle position likelihood L at S15. As such, the inputs for the calculations made at S18 may differ slightly from the inputs at S16. After S18, the process proceeds to S19.

At S19, the other vehicle map matcher 111 outputs the estimated position and the existence probability obtained at S18 to a predetermined processing unit that performs a drive support operation.

At S20, the other vehicle map matcher 111 determines whether the estimation ending period $T_e$ for receiving the BSMs from the other vehicles 2b has ended. If the other vehicle map matcher 111 determines that the estimation ending period $T_e$ has not ended, i.e., "NO" at S20, the process returns to S12. On the other hand, if the other vehicle map matcher 111 determines that the estimation ending period $T_e$ has ended, i.e., "YES" at S21, the process proceeds to S21.

At S21, the map matcher 111 discards any particle or particles for estimating the position of the other vehicle(s) 2b from BSMs that were not received during the estimation ending period $T_e$. When a BSM is not received during the estimation ending period $T_e$, the moving speed used in predictive update at S12 may have diverged too much from the actual moving speed, or the power supply in the other vehicle 2b may have already been turned OFF. As such, the particles from BSMs received outside the estimation ending period $T_e$ are discarded. The process then proceeds to S22.

At S22, the other vehicle map matcher 111 notifies the particle number controller 112 of the discarded particle(s). The particle number controller 112 performs a particle number assignment process, even if the particle number controller 112 receives (i.e., obtains) a discarded particle notification from the other vehicle map matcher 111, and changes the number of particles to be assigned to each of the other vehicles 2b. The particle number controller 112 then notifies the other vehicle map matcher 111 of the change in the number of particles. When the other vehicle map matcher 111 receives/obtains such a notification, the other vehicle map matcher 111 performs the process in FIG. 5 from the beginning (i.e., starting at S11).

[Process of the Particle Number Controller]

A process performed by the particle number controller 112 is described with reference to FIG. 6. The particle number controller 112 performs the process shown in FIG. 6 when the particle number controller 112 receives (i.e., obtains) either the particle assignment request (i.e., at S2 in FIG. 4) or the discard notification (i.e., at S22 in FIG. 5) from the other vehicle map matcher 111.

At S31, the particle number controller 112 attempts to assign a maximum number of particles. In other words, the particle number controller 112 performs a maximum particle number assignment attempt process at S31. The process calculates/determines whether a maximum number of particles $M_{max}$ can be assigned to all of the other vehicles 2b that are subject to the map matching process.

Figure 7:
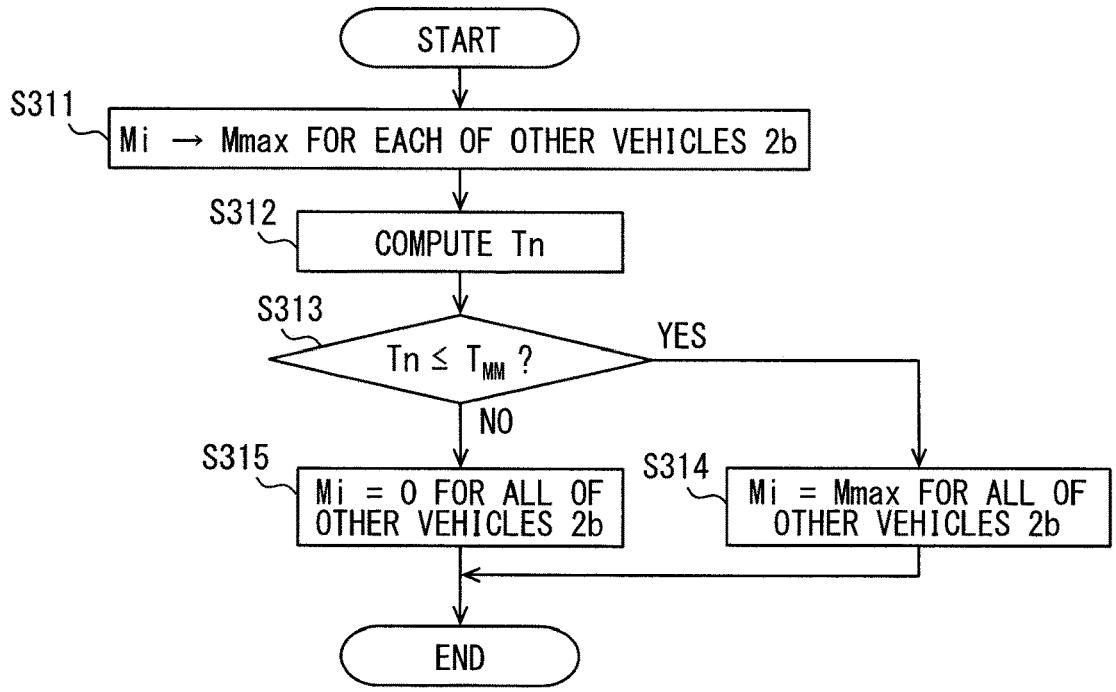
FIG. 7 is a flowchart of a maximum particle number assignment process performed by the particle number controller.

The maximum number assignment attempt process at S31 is shown in greater detail with reference to FIG. 7. In the maximum particle number assignment attempt process, the particle number controller 112 performs the process shown in FIG. 7. At S311, the particle number controller 112 sets the number of particles $M_i$ to be assigned to each of the other vehicles 2b as the maximum number of particles $M_{max}$. The maximum number of particles $M_{max}$ is a preset number. In the particle filtering process, the estimation accuracy improves as the number of particles increases. As such, the preset number of the maximum number of particles $M_{max}$ is set to a value that ensures sufficient or good estimation accuracy.

At S312, the particle number controller calculates a total process time $T_n$ to be used for the map matching process. The total process time $T_n$ can be calculated by using equation 2 below. In equation 2, n is the number of the other vehicles 2b that are map-matched, i is a variable integer that varies from 1 to n, and $T_i$ is a process time required for the map matching process of one of the other vehicles 2b, where i corresponds to the above-described variable.

$$T_n = \Sigma T_i \quad \text{(Equation 2)}$$

$T_i$ can be calculated from equation 3. In equation 3, C is a fixed portion of a process time required to update the position of one particle regardless of the number of particles. S is a variable portion of the process time required to update the position of one particle, which increases as the number of particles increases. $M_i$ is the number of particles assigned to one of the other vehicles 2b, where i corresponds to the above-described variable.

$$T_i = C + S \times M_i \quad \text{(Equation 3)}$$

At S313, the particle number controller 112 determines whether the total process time $T_n$ calculated at S312 is equal to or less than an assignment time $T_{MM}$. The assignment time $T_{MM}$ is the time assigned to one process cycle of the map matching process. One process cycle is the period for updating the positions of the subject vehicle 2a and the other vehicles 2b, and may be, for example, 100 ms. If the particle number controller 112 determines that the total process time $T_n$ is less than or equal to an assignment time $T_{MM}$, i.e., "YES" at S313, the process proceeds to S314. The assignment time $T_{MM}$ may be a fixed amount of time, or may be a variable amount of time that varies every process cycle and accounts for the time required for performing the other processes.

At S314, the particle number controller 112 sets the number of particles assigned to all of the other vehicles 2b to $M_{max}$.

If on the other hand, the particle number controller 112 determines that the total process time $T_n$ is greater than the assignment time $T_{MM}$, i.e., "NO" at S313, the process proceeds to S315. At S315, the particle number controller 112 sets the number of particles $M_i$ to be assigned to all of the other vehicles 2b to zero.

Figure 6:
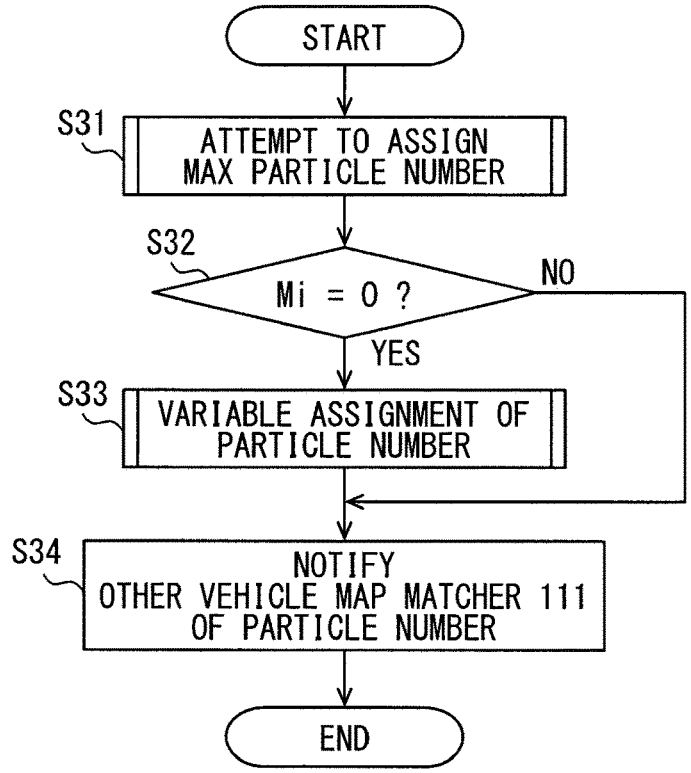
FIG. 6 is a flowchart of a process performed by a particle number controller.

After performing the maximum particle number assignment attempt process shown at S31 of FIG. 6, which is shown in greater detail by S311-S315 of FIG. 7, the process proceeds to S32 in FIG. 6. At S32, the particle number controller 112 determines whether the number of particles $M_i$ to be assigned to each of the other vehicles 2b is 0. If the particle number controller 112 determines that the number of particles $M_i$ is not equal to zero, i.e., "NO" at S32, the process proceeds to S34. On the other hand, if the particle number controller 112 determines that the number of particles $M_i$ is equal to zero, i.e., "YES" at S32, the process proceeds to S33. If the number of particles $M_i$ is zero, it means that the number of particles assigned to each of the other vehicles 2b has not yet been determined. As such, at S33, the particle number controller 112 performs a variable particle number assignment process for determining the number of particles to be assigned.

Figure 8:
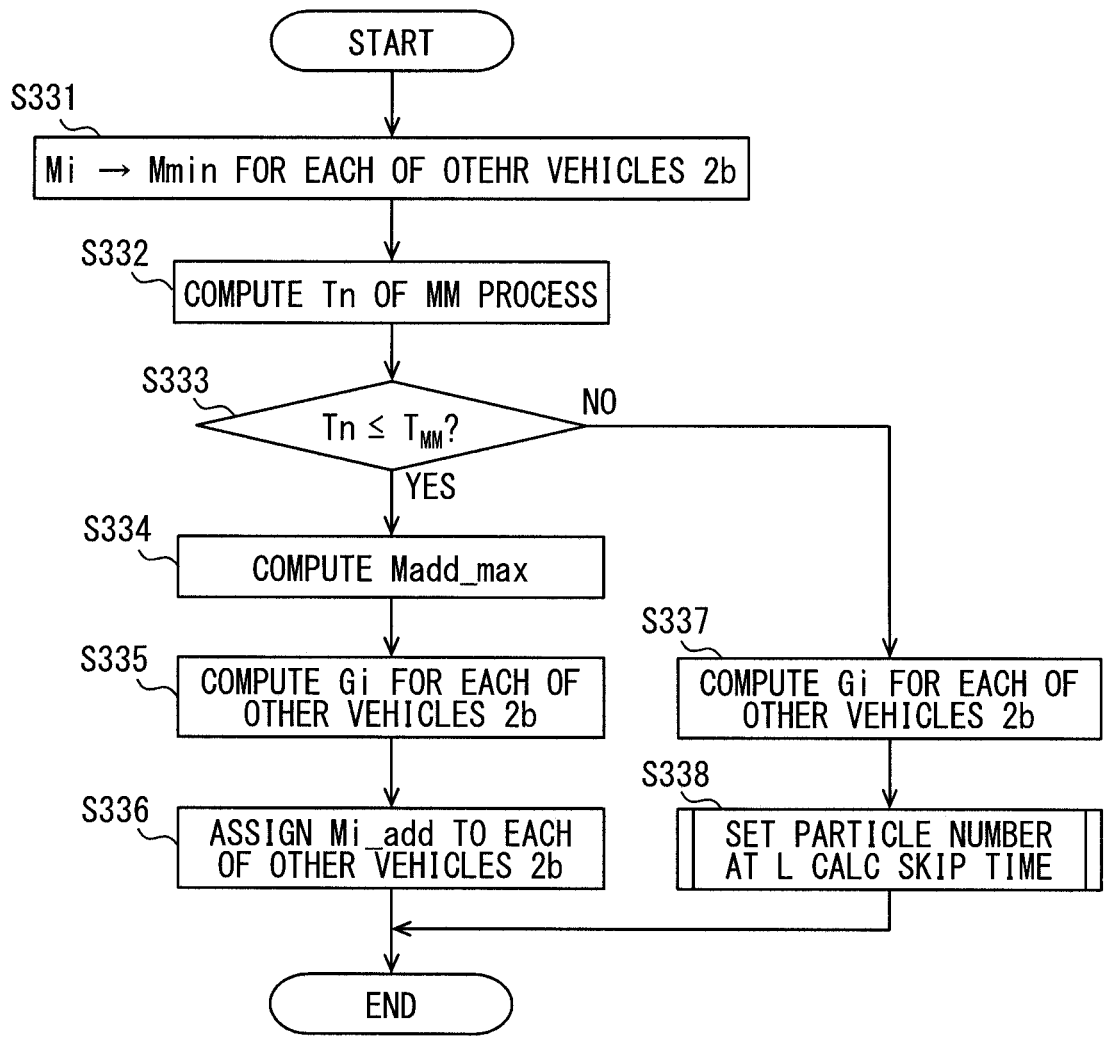
FIG. 8 is a flowchart of a variable particle number assignment process by particle number controller.

The variable particle number assignment process individually determines the number of particles to be assigned to each of the other vehicles 2b and is shown in greater detail with reference to FIG. 8.

In FIG. 8, at S331, the particle number controller 112 sets the number of particles $M_i$ assigned to each of the other vehicles 2b to a minimum number of particles $M_{min}$. The minimum number of particles $M_{min}$ is a number set to maintain the minimum position estimation accuracy of the other vehicle 2b by particle filtering.

At S332, the particle number controller 112 calculates the total process time $T_n$ to be used by the map matching process. The total process time $T_n$ is calculated from the equation 2 and the equation 3, similar to the calculations made by the particle number controller 112 at S311. However, since the number of particles $M_i$=the minimum number of particles $M_{min}$ at S331, the total process time $T_n$ calculated at S332 is different from the total process time $T_n$ calculated at S311.

At S333, the particle number controller 112 determines whether the total process time $T_n$ calculated at S332 is equal to or less than the assignment time $T_{MM}$. If the particle number controller 112 determines that the total process time $T_n$ is less than or equal to the assignment time $T_{MM}$, i.e., "YES" at S333, the process proceeds to S334.

At S334, the particle number controller 112 calculates the maximum number of particles $M_{add\_max}$ that can be additionally assigned. The maximum number of particles $M_{add\_max}$ can be calculated using equation 4. In equation 4, "Floor" is a function for calculating an integer value by truncation.

$$M_{add\_max} = \text{Floor}((T_{MM} - T_n)/S) \quad \text{(Equation 4)}$$

At S335, the particle number controller calculates a score $G_i$ for each of the other vehicles 2b. The score $G_i$ is an index used for relative evaluation of the position estimation accuracy required for the position of each of the other vehicles 2b. In other words, the score $G_i$ is a relative evaluation index of a required position estimation accuracy of the other vehicle(s) 2b. The score $G_i$ is calculated using equation 5.

$$G_i = W_{TC} \times W_{STATE} \times (G_{VAR} + G_{DIST} + G_{NUMEDGE} + G_{ATTR}) \quad \text{(Equation 5)}$$

In equation 5, $W_{TC}$ is a correction coefficient that is determined based on the positional relationship between the subject vehicle 2a and the other vehicle 2b on the road. $W_{STATE}$ is a correction coefficient that is determined from the relationship between the position of the other vehicle 2b and the road. $G_{VAR}$ is a score that is determined from a distribution diameter of the particle. $G_{DIST}$ is a score that is determined from the distance between the subject vehicle 2a and the other vehicle 2b. $G_{NUMEDGE}$ is a score based on the number of road IDs where particles are distributed (i.e., road IDs of the roads having a distribution of particles). $G_{ATTR}$ is a score based on the road type of the roads where particles are distributed. The distribution diameter of the particles, the number of the road IDs for roads where the particles are distributed, and the type of roads where the particles are distributed, respectively represent a distribution state of the particles. Initial values are respectively set for the correction coefficients W and the scores G. In the present embodiment, the initial value is the maximum value of each of those correction coefficients W and the scores G. That is, the particle number controller sets the initial value to the largest possible value of the respective coefficients and scores. The scores G, that is, the $G_{VAR}$ score, the $G_{DIST}$ score, the $G_{NUMEDGE}$ score, and the $G_{ATTR}$ score may each be considered and referred to as an accuracy evaluation score.

As described above, the $W_{TC}$ is a correction coefficient that is determined from the positional relationship between the position of the subject vehicle 2a on the road and the position of the other vehicle 2b on the road. The positional relationship between the subject vehicle 2a and the other vehicle 2b may be considered as a relative positional relationship between the subject vehicle 2a and the other vehicle 2b.

FIG. 9 shows an example table for determining the $W_{TC}$ correction coefficient. In the example shown in FIG. 9, when the position of the other vehicle 2b is on the same route that the subject vehicle 2a will follow, the correction coefficient $W_{TC}$ is set to 1.0. The route of the subject vehicle 2a is the road on which the subject vehicle 2a is going to travel. In the opposite case where the other vehicle 2b is following behind the subject vehicle 2a on the same road, the subject vehicle 2a is not considered to be following the same route as the other vehicle 2b. Since a road may be distinguished by multiple lanes, the other vehicle 2b traveling in an oncoming lane relative to the lane in which the subject vehicle 2a is traveling, is not considered a situation where the subject vehicle 2a follows or travels on the same route as the other vehicle 2b. As shown in FIG. 10, an example of an "on the route" other vehicle 2b is the other vehicle 2b1 that is traveling on the same route that the subject vehicle 2a will take.

In a case where a position of the other vehicle 2b is close to and/or approaching a position of the subject vehicle 2a at an intersection, the correction coefficient $W_{TC}$ is set to 1.0. The position of the other vehicle 2b approaching (i.e., "near" in FIG. 9) the subject vehicle 2a at an intersection means that the subject vehicle 2a and the other vehicle 2b are moving toward the same intersection. Additionally, when the difference of the respective distances of the two vehicles 2a, 2b to the intersection is equal to or less than a predetermined value, or when the difference of the respective times for arriving at the intersection is equal to or less than a predetermined value, the particle number controller 112 may determine that the position of the other vehicle 2b is approaching the subject vehicle 2a at the intersection. In FIG. 10, an example position of the other vehicle 2b approaching the subject vehicle 2a at an intersection is shown by the other vehicle 2b2.

When the other vehicle 2b is at an "other" position, that is, a position other than the "on the route" or intersection positions described above, the correction coefficient $W_{TC}$ is set to 0.5. In FIG. 10, an example "other" position is shown by the position of the other vehicle 2b3. Compared to the instances where the position of the other vehicle 2b is on the route of the subject vehicle 2a, or where the position of the other vehicle 2b approaches the subject vehicle 2a at an intersection, the variable particle number assignment process for the "other" position of the other vehicle 2b can be less accurate and be allocated a fewer number of particles. Consequently, in order to set a relatively low score $G_i$, the correction coefficient ($W_{TC}$) for the other position has a smaller value than the other two positions in the above-described examples.

FIG. 11 shows an example table for determining the $W_{STATE}$ correction coefficient. In the example table shown in FIG. 11, the correction coefficient $W_{STATE}$ is set to 1.0 when the position of the other vehicle 2b is on the road, is set to 0.5 when the position of the other vehicle 2b is off the road, and set to 0.2 when the position of the other vehicle 2b is undeterminable.

With reference to FIG. 12, the position of the other vehicle 2b4 is on the road. The position of the other vehicle 2b5 is off the road. The position of the other vehicle 2b6 is undeterminable. In the example vehicle positions shown in FIG. 12, the other vehicle 2b5 is parked in a parking lot.

In order to determine the correction coefficient $W_{STATE}$, the particle number controller 112 uses the observed position Z included in the BSM and the positions of the particles distributed by the other vehicle map matcher 111 as the position of the other vehicle 2b, instead of using the map matched position of the other vehicle 2b. The particle number controller 112 may use positions from multiple observations and multiple particle distributions to determine the correction coefficient $W_{STATE}$. By using the position data from multiple observations and particle distributions, the controller 112 can better determine whether the position of the other vehicle 2b is undeterminable or off the road.

In instances where the position of the other vehicle 2b is undeterminable may mean that at least one of the moving distances and the travel directions, as respectively calculated from the observed positions Z included in the two consecutive BSMs, are too divergent. That is, the moving distances and travel directions may have a high rate of change that exceeds a change rate threshold. In such a situation, the observed position Z included in the BSM is considered to contain a large error.

In instances where the position of the other vehicle 2b is off the road may specifically mean that there is no particle whose likelihood L is equal to or greater than a threshold value Lth for at least a period longer than a threshold time $T_{Lth}$.

In instances where the position of the other vehicle 2b is on the road, it is more likely that the subject vehicle 2a may have to determine whether to perform a drive support operation or drive assistance operation (e.g., driver warning, emergency braking, steering assist) when the other vehicle 2b changes positions on the road (i.e., based on the change in position of the other vehicle 2b). On the other hand, when the position of the other vehicle 2b is off the road, for example, such as when the other vehicle 2b is in a parking lot, it is less likely that the subject vehicle 2a will determine whether to perform the drive support operation in view of the position of the other vehicle 2b. Consequently, when the position of the other vehicle 2b is on the road, the correction coefficient $W_{STATE}$ is set to 1.0, and when the position of the other vehicle 2b is off the road, the correction coefficient $W_{STATE}$ is set to 0.5. When the position of the other vehicle 2b is undeterminable, it may mean that the accuracy of the observed position Z included in the BSM is too low. That is, map matching the other vehicle 2b may be difficult if the position accuracy of the BSM is too low. Since it is not necessary to assign many particles to another vehicle 2b that has a low likelihood of being map matched, the correction coefficient $W_{STATE}$ may be set to a low value of 0.2 in such cases in order to lower the score $G_i$.

FIG. 13 shows an example table for determining the $G_{VAR}$ score. The distribution diameter means a diameter of a circle containing all the particles distributed on a road.

In the example table shown in FIG. 13, the $G_{VAR}$ score is set to 5 if the distribution diameter is 10 m or more, set to 4 if the distribution diameter is between 2 m and 10 m, and set to 2 if the distribution diameter is less than 2 m. When the distribution diameter is small, it means that a plurality of particles have already been concentrated in a narrow area, indicating that necessity of assigning an additional amount of particles to such area in the future is relatively low. Consequently, the smaller the distribution diameter, the smaller the $G_{VAR}$ score.

FIG. 14 shows an example table for determining the $G_{DIST}$ score. In the example table shown in FIG. 14, the $G_{DIST}$ score is set to 5 if the distance from the subject vehicle 2a to the other vehicle 2b is less than 50 m, set to 4 if the distance is between 50 m and 100 m, and set to 2 if the distance is 100 m or more. As the distance from the subject vehicle 2a increases, the necessity for accurately estimating the position of the other vehicle 2b is reduced. Consequently, the $G_{DIST}$ score is set to a smaller value as the distance from the subject vehicle 2a increases. The distance between the subject vehicle 2a and the other vehicle 2b is one of the values representing the relative relationship between the position of the subject vehicle 2a and the position of the other vehicle 2b.

FIG. 15 shows an example table for determining the $G_{NUMEDGE}$ score. In the example table shown in FIG. 15, if the number of the road IDs on which the particles are distributed is 3 or more, the $G_{NUMEDGE}$ score is set to 3. If the number of the road IDs on which the particles are distributed is 2, the $G_{NUMEDGE}$ score is set to 2. If the number of road IDs on which the particles is distributed is 1, the $G_{NUMEDGE}$ score is set to 1. When the number of the road IDs on which the particles are distributed is small, it suggests that the plurality of particles are already convergently distributed on a few roads. That is, the necessity to assign an amount of additional particles to those roads is relatively low. Consequently, the $G_{NUMEDGE}$ score is set to a smaller value as the number of the road IDs on which the particles are distributed is reduced.

FIG. 16 shows an example table for determining the $G_{ATTR}$ score. In the example table shown in FIG. 16, if the road on which the particles are distributed is an expressway (i.e., the road type is an expressway) shown as "EXPY" in FIG. 16, the $G_{ATTR}$ score is set to 2, otherwise the $G_{ATTR}$ score is set to 1 (e.g., the road type is a city street, surface street). Note that if the road on which the particles are distributed is classified or defined as more than one road type, the higher value among the multiple road types is used.

Since an expressway has a higher speed limit, the particles on the expressway will have a higher moving speed. As such, the particle position on an expressway may be evaluated similarly to when the particles are at a position close to the subject vehicle 2a. Therefore, when the road type of the road on which the particles are distributed is an expressway, the $G_{ATTR}$ score is set to a higher value than the other road types.

With reference again to FIG. 8, at S335 the particle number controller 112 determines the correction coefficient $W_{TC}$, the correction coefficient $W_{STATE}$, the $G_{VAR}$ score, the $G_{DIST}$ score, the $G_{NUMEDGE}$ score, and the $G_{ATTR}$ score by respectively using the tables shown in FIGS. 9, 11, 13, 14, 15, and 16. The particle number controller 112 then substitutes the correction coefficients W and scores G that it determines into equation 5, and calculates the score $G_i$ for each of the other vehicles 2b. The process then proceeds to S336

At S336, the particle number controller 112 sets the additional number of particles $M_{i\_add}$ to be assigned to each of the other vehicles 2b. The particle number controller 112 then adds the additional number of particles $M_{i\_add}$ to the minimum number of particles $M_{min}$ to determine the number of particles to be assigned to each of the other vehicles 2b. The particle number controller 112 at S336 determines the additional number of particles $M_{i\_add}$ using equations 6 and 7. Equation 6 calculates how many particles can be assigned per score. Equation 7 multiplies the number of particles per score by the obtained score $G_i$ with the truncation to an integer value, for each of the other vehicles 2b.

$$M_{coef} = (M_{add\_max} / \Sigma G_i) \quad \text{(Equation 6)}$$

$$M_{i\_add} = \text{Floor}(M_{coef} \times G_i) \quad \text{(Equation 7)}$$

Determining the number of particles for each of the other vehicles 2b in the above-described manner is based on a relative comparison of the scores $G_i$ among the other vehicles 2b.

If the particle number controller 112 determines that the total process time $T_n$ is greater than the assignment time $T_{MM}$, i.e., "NO" at S333, the process proceeds to S337. At S337, the particle number controller 112 performs a process similar to the process in S335 to calculate the score $G_i$ for each of the other vehicles 2b. When the particle number controller 112 determines that the total process time $T_n$ exceeds the assignment time $T_{MM}$ at S333, if the likelihood L has been calculated for all the other vehicles 2b for the resampling process, it is impossible to assign the minimum number of particles $M_{min}$ to all of the other vehicles 2b.

Consequently, at S338, the particle number controller 112 performs a particle number setting process when the likelihood L calculation is skipped (i.e., at L calculation skip time). At S338, the particle number controller 112 performs the process shown in FIG. 17.

Figure 17:
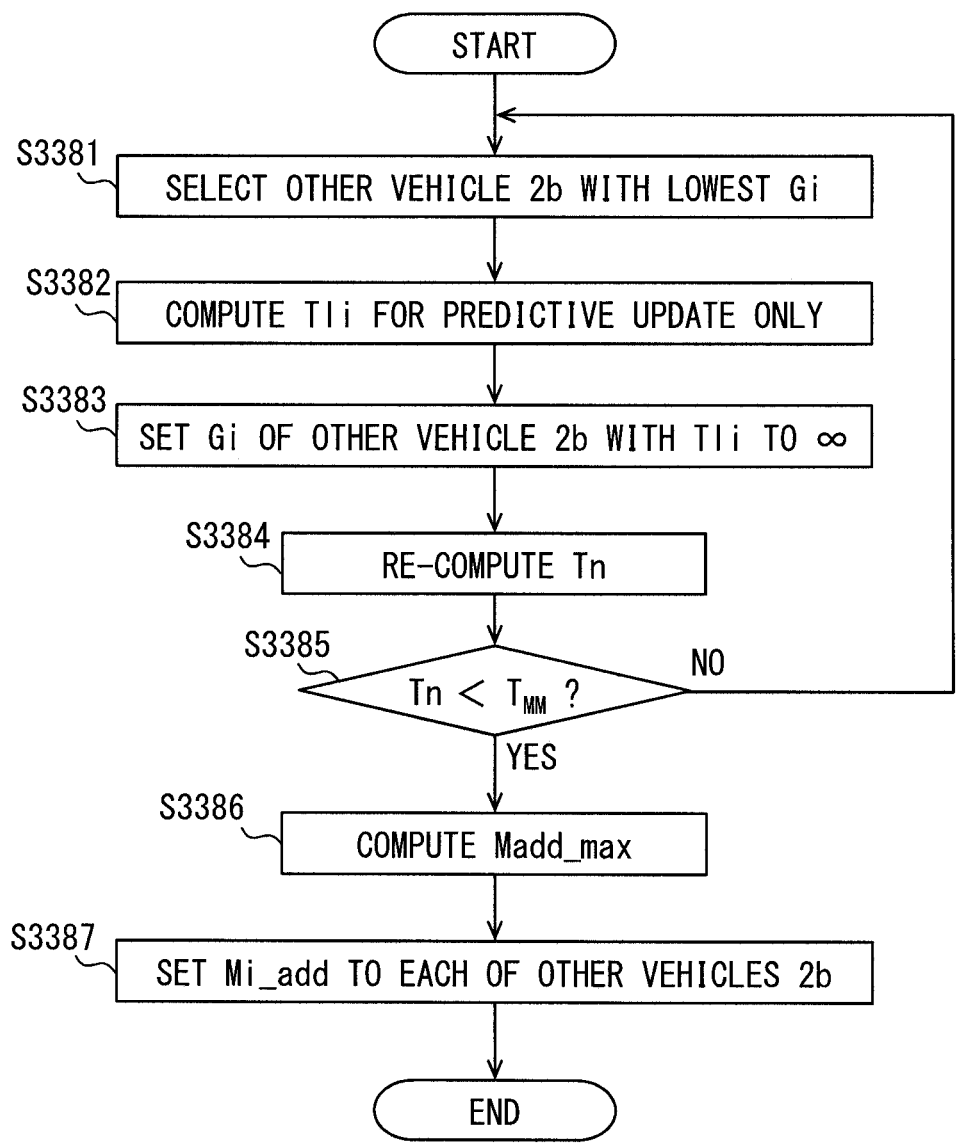
FIG. 17 is a flowchart of a particle number setting process performed by the particle number controller.

With reference to FIG. 17, at S3381, the particle number controller 112 selects the other vehicle 2b having the lowest score $G_i$ calculated at S337. The process then proceeds to S3382.

At S3382, the particle number controller 112 calculates a process time $T_{li}$ required for the position estimation process by predictive update only for the other vehicle 2b that is selected at S3381. This process time $T_{li}$ is calculated using equation 8. In the equation 8, $C_l$ is a fixed portion of the process time required for calculating the updated position of one particle by only using the predictive update in the position estimation process, regardless of the number of particles. $S_l$ is a variable portion of the process time required for calculating the updated position of one particle by only using the predictive update in the position estimation process. $S_l$ increases every time the number of particles increases by one. $C_l$ and $S_l$ are both preset values. The process time $T_{li}$ calculated by equation 8 is shorter than the process time $T_i$ calculated by equation 3, because the likelihood L calculation and resampling are not performed. The process then proceeds to S3383.

$$T_{li} = C_l + S_l \times M_i \quad \text{(Equation 8)}$$

At S3383, the particle number controller 112 sets the score $G_i$ of the other vehicle 2b for which the process time $T_{li}$ has been calculated at S3382 to an infinite value (i.e., infinity). The infinite setting is to prevent a repeated selection of the same other vehicle 2b when the particle number controller 112 next performs the process at S3381. The process then proceeds to S3384.

At S3384, the process time $T_{li}$ calculated at S3382 is also treated as $T_i$, the particle number controller 112 recalculates the total process time $T_n$ using equation 2, and the process proceeds to S3385.

At S3385, the particle number controller 112 determines whether the total process time $T_n$ calculated at S3384 is less than the assignment time $T_{MM}$. If the particle controller 112 determines that the total process time $T_n$ is not less than the assignment time $T_{MM}$, i.e., "NO" at S3385, the process returns to S3381 to make further reductions to the total process time $T_n$. On the other hand, the particle controller 112 determines that the total process time $T_n$ is less than the assignment time $T_{MM}$, i.e., "YES" at S3385, the process proceeds to S3386.

At S3386, the particle number controller 112 calculates the maximum number of particles that can be additionally assigned as $M_{add\_max}$. The calculation process at S3386 is similar to the calculation made at S334, and $M_{add\_max}$ is calculated using equation 4. However, the value calculated at S3384 is used for the total process time $T_n$.

At S3387, the particle number controller 112 sets the number of additional particles $M_{i\_add}$ to be assigned to each of the other vehicles 2b, and this additional number of particles $M_{i\_add}$ is added to the minimum number of particles $M_{min}$ to determine the number of particles for each of the other vehicles 2b. The process at S3387 is similar to the process at S336, and $M_{i\_add}$ is set using equations 6 and 7. However, the value calculated at S3386 is used for the maximum number of particles that can be additionally added $M_{add\_max}$.

The process shown in FIG. 17 ends after S3387. When the process shown in FIG. 17 ends, the process shown in FIG. 8 also ends.

With reference again to FIG. 6, the process proceeds to S34 of FIG. 6 upon the completion of the process shown in FIG. 8. The process in FIG. 6 also proceeds to S34 when the particle number controller 112 determines that the number of particles $M_i$ to be assigned each of the other vehicles 2b is not equal to zero, i.e., "NO" at S32.

At S34, the particle number controller 112 notifies the other vehicle map matcher 111 of the number of particles for each of the other vehicles 2b as determined by the processes performed by the particle number controller 112.

SUMMARY OF THE EMBODIMENT

The other vehicle position estimation apparatus 100 according to the present embodiment described above uses a particle filter to estimate the position of each of the other vehicles 2b on the road. The particle filter can adjust the number of particles, and the particle number controller 112 can control the number of particles so that the total process time $T_n$ for estimating the position of each of all the other vehicles 2b is equal to or less than the assignment time $T_{MM}$. As a result, it is possible to estimate the position of each of the other vehicles 2b on the road while limiting increases in the processing time.

The other vehicle position estimation apparatus 100 determines the number of particles to be assigned to each of the other vehicles 2b based on the score $G_i$ calculated by equation 5. The values of various terms, e.g., $W_{TC}$, $W_{STATE}$, $G_{VAR}$, $G_{DIST}$, $G_{NUMEDGE}$, and $G_{ATTR}$, included in equation 5 may be determined based on the relative relationship between the position of the subject vehicle 2a and the position of the other vehicle 2b, the distribution state of the particles, or the relationship between the position of the other vehicle 2b and the road. The relative relationship between the position of the subject vehicle 2a and the position of the other vehicle 2b, the distribution state of the particles, and the relationship between the position of the other vehicle 2b and the road are all an index for determining the position estimation accuracy of the other vehicle 2b. Consequently, by determining the number of particles to be assigned to each of the other vehicles 2b based on the score $G_i$ calculated by equation 5, it is possible to limit deteriorations in the position estimation accuracy with respect to the other vehicle 2b and maintain a high level of position estimation accuracy.

Since it is possible to dynamically change the number of particles on the fly or as needed, increases to the total process time $T_n$ can be limited and/or prevented, even when the number of other vehicles 2b whose positions are being estimated increases, or when the position estimation of another vehicle 2b requires a high degree of position estimation accuracy.

Although an embodiment of the present disclosure has been described above, the description of the embodiment is not intended to limit the embodiment. That is, the following modified examples are also included in the scope of the present disclosure, together with various other modifications pertaining to the scope of the disclosure.

First Modification

The basic safety message (BSM) includes not only the position of the other vehicle 2b but also the travel direction, the travel speed, the acceleration, and the yaw rate of the other vehicle 2b. These attributes are collectively referred to as a travel state. In the embodiment, the position of the other vehicle 2b is estimated on the road of the road map data based on the position of the other vehicle 2b included in the BSM. However, the other vehicle map matcher 111 may estimate the position of the other vehicle 2b on the road of the road map data based on one or more travel states included in the BSM.

In such a case, Z in equation 1 may be used as the travel state included in the BSM. Y may be the motion state of a particle after the predictive update. The motion state of a particle is a parameter corresponding to the travel state used as Z that includes the attributes of a particle such as the particle position, the travel direction, the travel speed, the acceleration, and the yaw rate.

In order to obtain these parameters, the predictive update of the motion state of a particle is performed at S12. The predictive update of the motion state of a particle can be performed in various ways. For example, speed can be updated as a time integration of acceleration. Conversely, acceleration can be updated, for example, as the time differential value of the speed with reference to a particle speed.

As described in the above embodiment, when updating the position of the particle, the travel direction of the road is used. Information in the road map data can also be used in addition to, or in place of, the position of a particle to make predictive updates to the motion state of the particle. For example, it is possible to use the travel direction of the road as the travel direction of a particle. The speed limit of the road can also be used as the speed of a particle. The acceleration of a particle can be calculated taking the inclination of the road surface into account. It is also possible to calculate the speed and acceleration of a particle from a traffic flow of the location (i.e., a location-specific traffic flow). The traffic flow can be a typical/representative speed of a vehicle traveling on the road. The traffic flow may be included in the road map data as a standard reference value, or a current value of the traffic flow may be obtained by communication outside the vehicle (e.g., V2V communication, local area network (LAN), a cellular network). It is also possible to calculate the yaw rate from the shape of the road and the speed of a particle.

Second Modification

In the above-described embodiment, particles are distributed on the road. However, some of the particles may be distributed off the road, such as in a parking lot, road-side parking spaces, a driveway, a racetrack, and other areas off the road. The other vehicle position estimation apparatus 100 may also determine whether the other vehicle 2b is in an area outside of, or off the road.

As described in the First Modification, equation 1 can be calculated using Z and Y in equation 1 as a plurality of parameters included in the vehicle motion information. However, in the Second Modification, the travel direction is not included in the parameters that are used in the calculation of equation 1. Unlike the road, the travel direction in the area off the road cannot be determined from the map data. Alternatively, it may be conceivable to set 0 (zero) to only a certain term in equation 1 such as Z or Y (e.g., the travel direction may be set to 0 (zero)) to maintain the calculation result of equation 1 (i.e., so that the calculation result is unchanged/unaffected).

Third Modification

Any one or more of the correction coefficients W and the scores G shown in equation 5 may be omitted. The correction coefficients W and the scores G may also be exchanged/swapped.

Fourth Modification

Factors other than the ones described in the above embodiment may be used for the correction coefficients W and the scores G. For example, a correction coefficient $W_V$ determined from the actual vehicle speed of the other vehicle 2b may be added to equation 5. The actual vehicle speed of the other vehicle 2b may be obtained from the other vehicle 2b, for example, by wireless communication. The correction coefficient $W_V$ may be set, for example, to 0.1 if the actual vehicle speed of the other vehicle 2b is less than 10 km/h, or to 1 if the actual vehicle speed is equal to or greater than 10 km/h. If the actual vehicle speed is less than 10 km/h, the other vehicle 2b may be determined as in a stop or near-stop state. In a stop or near-stop state, the other vehicle 2b may have little effect on the travel of the subject vehicle 2a. As such, the other vehicle 2b may have a relatively small number of assigned particles. Thus, when the actual vehicle speed is less than 10 km/h, the correction coefficient $W_V$ is set to a relatively small value.

Fifth Modification

When the position of the other vehicle 2b becomes undeterminable, the map matching process may be stopped for the other vehicle 2b whose position cannot be determined.

Sixth Modification

The installation of the other vehicle position estimation apparatus 100 in the vehicle 2 may not be a permanent or fixed installation. That is, the other vehicle position estimation apparatus 100 may be a portable apparatus that may be brought into the vehicle 2 for use.

Although the present disclosure has been described in connection with the embodiment and modifications with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:
1. An other vehicle position estimation apparatus for use in a subject vehicle to estimate a position of an other vehicle on a road, the other vehicle position estimation apparatus comprising:
   a communicator configured to transmit a travel state of the subject vehicle and to receive a travel state of the other vehicle;
   an updater configured to sequentially update a position of a particle that is distributed over a map to represent a candidate position of the other vehicle based on at least one of
      map information, and
      the travel state obtained from the other vehicle;
   a likelihood calculator configured to calculate a degree of likelihood of the position of the distributed particle based on a motion state of the distributed particle and the travel state of the other vehicle;
   a position estimator configured to estimate the position of the other vehicle based on the position of the particle; and
   a particle number controller configured to determine a number of particles to distribute, wherein the particle number controller is further configured to determine the number of particles to distribute to estimate the position of the other vehicle based on at least one of a relative relationship between the position of the other vehicle and a position of the subject vehicle, an actual vehicle speed of the other vehicle, a distribution state of the particles, and a relationship between the position of the other vehicle and the road.

2. The other vehicle position estimation apparatus of claim 1, wherein the particle number controller is further configured to determine an accuracy evaluation score as a relative evaluation index of a required position estimation accuracy of the other vehicle based on at least one of the relative relationship between the position of the subject vehicle and the position of the other vehicle, the distribution state of the particles, and the relationship between the position of the other vehicle and the road, and to determine the number of particles distributed for estimating the position of the other vehicle based on the accuracy evaluation score.

3. The other vehicle position estimation apparatus of claim 2, wherein the particle number controller is further configured to determine the accuracy evaluation score based on a distance between the subject vehicle and the other vehicle, and the accuracy evaluation score represents the relative relationship between the position of the subject vehicle and the position of the other vehicle.

4. The other vehicle position estimation apparatus of claim 2, wherein the particle number controller is further configured to determine the accuracy evaluation score based on a positional relationship on the road between the subject vehicle and the other vehicle, and the accuracy evaluation score represents the relative relationship between the position of the subject vehicle and the position of the other vehicle.

5. The other vehicle position estimation apparatus of claim 2, wherein the particle number controller is further configured to determine the accuracy evaluation score based on a distribution diameter of the particles, and the accuracy evaluation score represents the distribution state of the particles.

6. The other vehicle position estimation apparatus of claim 2, wherein the particle number controller is further configured to determine the accuracy evaluation score based on a number of roads on which the particles are distributed and the accuracy evaluation score represents the distribution state of the particles.

7. The other vehicle position estimation apparatus of claim 2, wherein the particle number controller is further configured to determine the accuracy evaluation score based on a road type on which the particles are distributed and the accuracy evaluation score represents the distribution state of the particles.

8. The other vehicle position estimation apparatus of claim 2, wherein the particle number controller is further configured to set an initial value of the accuracy evaluation score to a largest possible value.

9. The other vehicle position estimation apparatus of claim 1, wherein the particle number controller is further configured to calculate a process time for estimating the position of one of a plurality of the other vehicles, based on a process time for calculating an update of the position of one particle, and a number of particles assigned to each of the plurality of the other vehicles, and wherein the particle number controller is further configured to determine the number of particles to distribute based on (i) a total process time determined from the process time to estimate the position of the one of the plurality of the other vehicles, and the number of the other vehicles whose positions are being estimated, and (ii) an assignment time that is assigned for estimating the positions of the plurality of the other vehicles.

10. The other vehicle position estimation apparatus of claim 1, wherein the particle number controller is further configured to set the number of particles to distribute for the other vehicle to a value equal to or less than a predetermined maximum number of particles.

11. The other vehicle position estimation apparatus of claim 1, wherein the particle number controller is further configured to set the number of particles to distribute for the other vehicle to a value equal to or greater than a predetermined minimum number of particles.

* * * * *